(12) United States Patent
Park

(10) Patent No.: US 12,283,204 B2
(45) Date of Patent: Apr. 22, 2025

(54) VEHICLE AND MOBILE DEVICE COMMUNICATING WITH THE VEHICLE

(71) Applicants: Hyundai Motor Company, Seoul (KR); Kia Corporation, Seoul (KR)

(72) Inventor: Seyoung Park, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 120 days.

(21) Appl. No.: 18/338,959

(22) Filed: Jun. 21, 2023

(65) Prior Publication Data
US 2024/0153415 A1 May 9, 2024

(30) Foreign Application Priority Data
Nov. 3, 2022 (KR) .......................... 1020220145358

(51) Int. Cl.
| | |
|---|---|
| G08B 21/00 | (2006.01) |
| B60Q 5/00 | (2006.01) |
| B60W 60/00 | (2020.01) |
| G09F 9/30 | (2006.01) |
| G09F 27/00 | (2006.01) |

(52) U.S. Cl.
CPC ............. G09F 27/005 (2013.01); B60Q 5/00 (2013.01); B60W 60/0025 (2020.02); G09F 9/30 (2013.01)

(58) Field of Classification Search
CPC ........... G09F 27/005; G09F 9/30; B60Q 5/00; B60Q 1/507; B60Q 1/543; B60Q 1/547; B60Q 5/005; B60Q 1/46; B60W 60/0025; B60W 60/00253; B60W 2420/403; B60W 2556/50; B60W 40/02; B60W 2556/45; B60W 2756/10; G06Q 30/018; G06Q 50/40; H04N 7/185; H04W 4/44; B60Y 2200/11
USPC ......................................................... 340/901
See application file for complete search history.

(56) References Cited

U.S. PATENT DOCUMENTS

| | | | | |
|---|---|---|---|---|
| 9,340,155 | B2 * | 5/2016 | Pisz | B60Q 1/543 |
| 2017/0213165 | A1 * | 7/2017 | Stauffer | G06Q 10/02 |
| 2018/0204370 | A1 * | 7/2018 | Wilson | B60Q 1/5035 |
| 2022/0013045 | A1 * | 1/2022 | Takeda | B60K 35/81 |
| 2022/0080879 | A1 * | 3/2022 | Moon | B60Q 1/547 |
| 2023/0211787 | A1 * | 7/2023 | Hanson | G01S 13/0209 |
| 2023/0350621 | A1 * | 11/2023 | Salter | G06V 40/10 |

* cited by examiner

*Primary Examiner* — Mark S Rushing
(74) *Attorney, Agent, or Firm* — Fish & Richardson P.C.

(57) ABSTRACT

Disclosed herein a vehicle and a mobile device communicating with the vehicle. The vehicle includes a display disposed on an exterior of a vehicle body, a communication interface configured to receive current location information of the vehicle and communicate with a mobile device, and a processor configured to, in response to receipt of call information transmitted from the mobile device and current location information of the mobile device, control autonomous driving to a location of the mobile device based on the current location information of the mobile device and the current location information of the vehicle, and in response to a distance with the mobile device being less than or equal to a first reference distance control the display to display marking information and transmit the marking information to the mobile device.

16 Claims, 13 Drawing Sheets

VEHICLE AND MOBILE DEVICE COMMUNICATING WITH THE VEHICLE

CROSS-REFERENCE TO RELATED APPLICATION(S)

This application claims the benefit of Korean Patent Application No. 10-2022-0145358, filed on Nov. 3, 2022, the contents of which are incorporated by reference herein in their entirety.

TECHNICAL FIELD

The present disclosure relates to a vehicle performing autonomous driving and guiding passengers to board, and a mobile device communicating with the vehicle.

BACKGROUND

In urban environments, buses and taxis play a crucial role in transportation.

For example, with the implementation of bus systems, such as bus information system (BIS) or bus rapid transit (BRT) system, there is a shift in the placement of bus stops from a roadside to a center of the road. Consequently, frequent safety accidents occur between buses and pedestrians. Moreover, multiple bus stops are dispersed within a certain zone, resulting in passengers having to search the bus stop where their desired bus arrives.

Recently, technologies enabling autonomous control of vehicle based on predefined route information have emerged and are gradually being adopted in buses and taxis. For example, where multiple buses and taxis gather at stops, need for providing passengers with information regarding available vehicles for boarding are required.

SUMMARY

An aspect of the present disclosure is to provide a vehicle configured for outputting boarding guidance information, such as boarding location information and identification information of the vehicle to be boarded, and a mobile device configured for communicating with the vehicle.

Another aspect of the present disclosure is to provide a mobile device configured for outputting boarding guidance information, such as boarding location information and identification information of a vehicle to be boarded through augmented reality.

Additional aspects of the disclosure will be set forth in part in the description which follows and, in part, will be obvious from the description, or may be learned by practice of the disclosure.

In accordance with an aspect of the disclosure, a vehicle includes a display disposed on an exterior of a vehicle body, a communication interface configured to receive current location information of the vehicle and communicate with a mobile device, and a processor configured to, in response to receipt of call information transmitted from the mobile device and current location information of the mobile device, control autonomous driving to a location of the mobile device based on the current location information of the mobile device and the current location information of the vehicle, and in response to a distance with the mobile device being less than or equal to a first reference distance control the display to display marking information and transmit the marking information to the mobile device.

The vehicle may further include an emergency light, wherein the processor may determine, based on the current location information of the mobile device and the current location information of the vehicle, whether the distance with the mobile device falls within a preset distance, and turn on the emergency light in response to the distance with the mobile device falling within the preset distance.

The vehicle may further include a speaker, wherein the processor may control the speaker to output a notification sound in response to the distance with the mobile device falling within the preset distance.

The marking information may include at least one of text information, color information, and QR code information.

The communication interface may communicate with an infrastructure, and the processor may control, in response to the marking information being received from the infrastructure, the display to display the received marking information.

The vehicle may further include a plurality of cameras, wherein the processor may generate a view image based on at least one of image information obtained by the plurality of cameras, obtain distance information with the infrastructure based on the current location information of the vehicle and location information of the infrastructure, and transmit, in response to the distance with the infrastructure being less than or equal to a second reference distance based on the obtained distance information, the generated view image to the mobile device.

The vehicle may further include a plurality of cameras, wherein the processor may generate a view image based on at least one of image information obtained by the plurality of cameras, obtain distance information with the infrastructure based on the current location information of the vehicle and location information of the infrastructure, predict an arrival time to arrive at the infrastructure based on the obtained distance information and driving speed information of the vehicle, and transmit, in response to the predicted arrival time being a preset time, the generated view image to the mobile device.

The vehicle may further include a plurality of cameras, wherein the processor may generate a view image based on at least one of image information acquired by the plurality of cameras, and transmit the generated view image to the mobile device.

The processor may transmit map information matched with the current location information of the vehicle to the mobile device.

The processor may transmit the map information matched with the current location information of the vehicle and the view image to the mobile device at the same time.

The processor may recognize an object around the vehicle based on the map information matched with the current location information of the vehicle and the view image, and transmit information on the recognized object and the distance information with the mobile device to the mobile device.

The vehicle may further include at least one camera, wherein the processor may recognize an identifier around an infrastructure based on image information acquired by the at least one camera, and transmit the recognized identifier to the mobile device.

In accordance with another aspect of the disclosure, a mobile device includes a communication interface configured to receive current location information of the mobile device and communicate with a vehicle, an inputter configured to receive call information for calling the vehicle by using a user input, a display, and a processor configured to transmit, in response to receipt of response information from the vehicle, the current location information of the mobile device to the vehicle, and control, in response to receipt of marking information from the vehicle, the display to display the received marking information.

The communication interface may communicate with an infrastructure, and the processor may control the display to display the received marking information in response to the marking information of the vehicle being received from the infrastructure.

The processor may control, in response to receipt of a view image from the vehicle, the display to display the received view image.

The processor is configured to control, in response to map information matched with current location information of the vehicle and a view image being received from the vehicle, the display to simultaneously display the map information matched with the current location information of the vehicle and the view image.

The processor may control, in response to distance information being received from the vehicle, the display to display the received distance information with the vehicle, and control, in response to object information being received from the vehicle, the display to display the received object information.

The mobile device may further include a cameras, wherein the processor may generate an augmented reality (AR) image based on an image obtained by the camera and a view image transmitted from the vehicle, and control the display to display the generated AR image.

The processor may adjust the view image in response to a user input received by the inputter.

The view image may include at least one of a surrounding monitoring view image and a 360-degree variable view image, and the processor may control the display to display at least one of the surrounding monitoring view image and the 360-degree variable view image in response to a user input received by the inputter.

DETAILED DESCRIPTION

Figure 1:
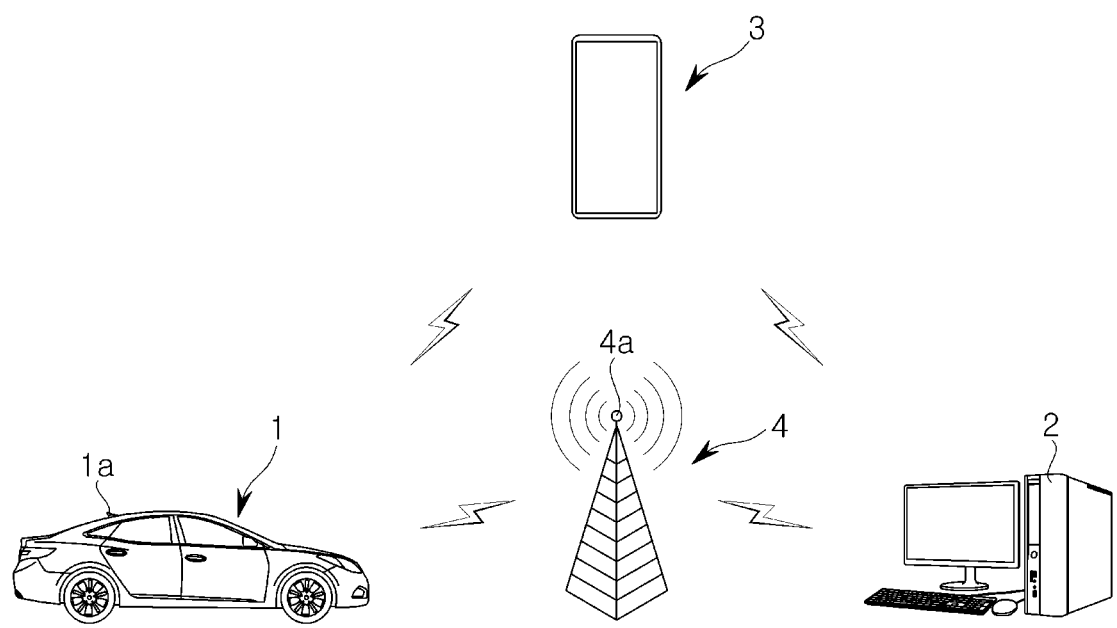
FIG. 1 is a view illustrating communication of a vehicle.

FIG. 1 is a view illustrating a communication of a vehicle, and will be described with reference to FIG. 2.

FIG. 1 shows a communication between a vehicle 1, a server 2, a mobile device 3, and an infrastructure 4.

The vehicle 1 may radiate externally electromagnetic waves through an antenna 1a.

The antenna 1a of the vehicle may emit electromagnetic waves corresponding to electrical signals transmitted from a first processor 180 (see FIG. 5) provided in the vehicle 1. In other words, the vehicle 1 may emit electromagnetic waves to at least one of the mobile device 3, the server 2, and the infrastructure 4.

The vehicle 1 receives electromagnetic waves emitted from at least one of the infrastructure 4, the server 2, and the mobile device 3 through the antenna 1a, and converts the received electromagnetic waves into electrical signals.

The vehicle 1 demodulates the electromagnetic waves received through the antenna 1a to converts electrical signals, generates control signals corresponding to the converted electrical signals, and uses the generated control signals to control the vehicle 1.

The vehicle 1 communicates with the server 2. In addition, the vehicle 1 may communicate with the server 2 through the infrastructure 4 of a road.

The vehicle 1 may transmit response information or rejection information to the mobile device 3 in response to call information transmitted from the mobile device 3.

After transmitting the response information to the mobile device 3, the vehicle 1 generates a route based on current location information of the vehicle 1 and current location information of the mobile device 3, and controls autonomous driving based on the generated route.

The vehicle 1 may obtain, based on the current location information of the vehicle 1 and the current location information of the mobile device 3 during autonomous driving, distance information between the vehicle 1 and the mobile device 3, and upon determining that a distance between the vehicle and the mobile device is less than or equal to a reference distance based on the obtained distance information, generate stopped position information of the vehicle based on image information obtained from a plurality of cameras and transmit the stopped position information of the vehicle 1 to the mobile device 3.

The stopped position information of the vehicle 1 may include surrounding monitoring view information and may include 360-degree variable view information.

Figure 4A:
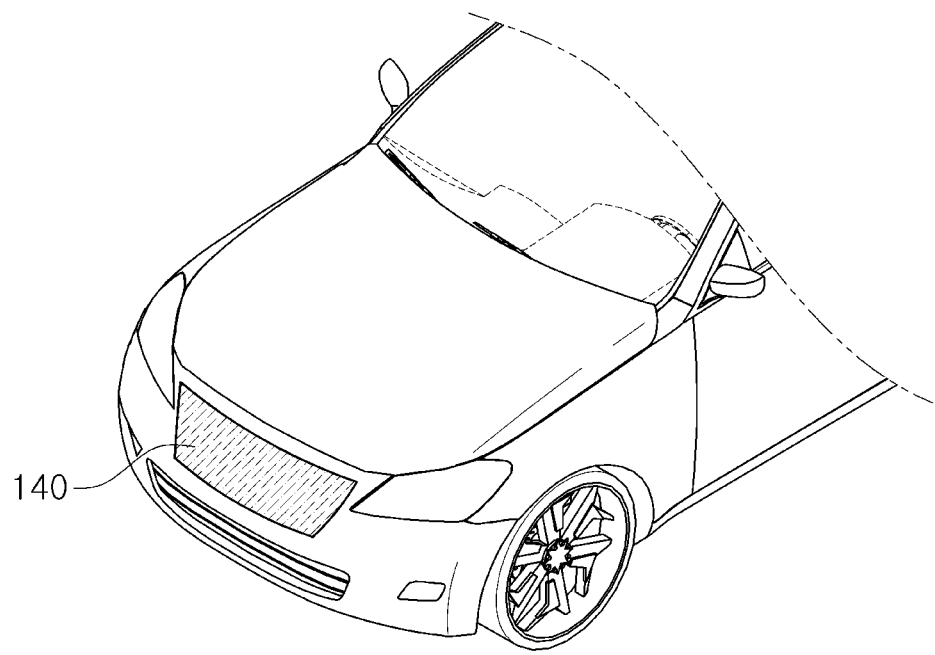
FIG. 4A, FIG. 4B, and FIG. 4C are views illustrating a display a vehicle.
Figure 4B:
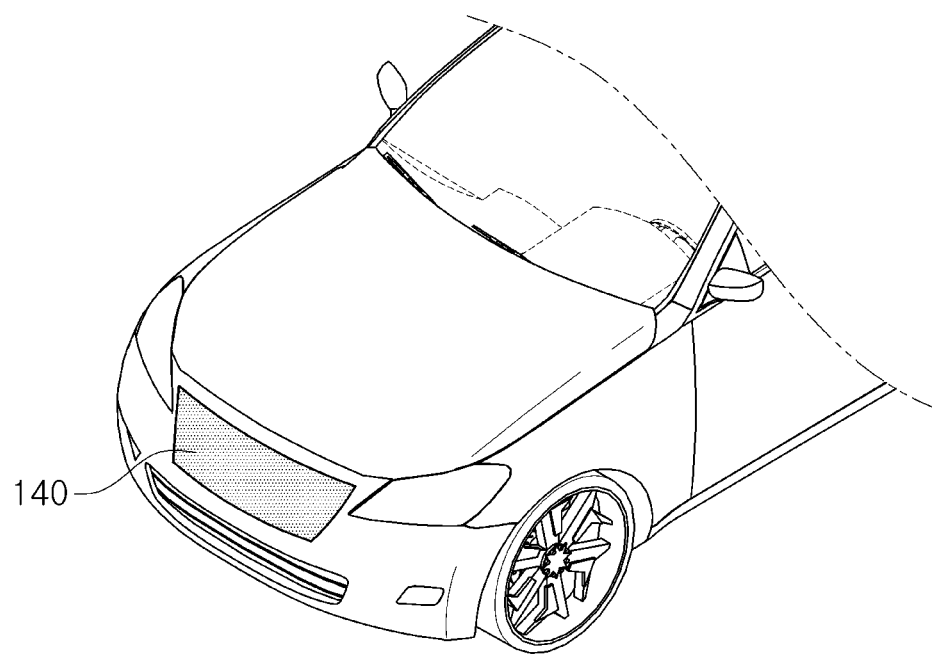
Figure 4C:
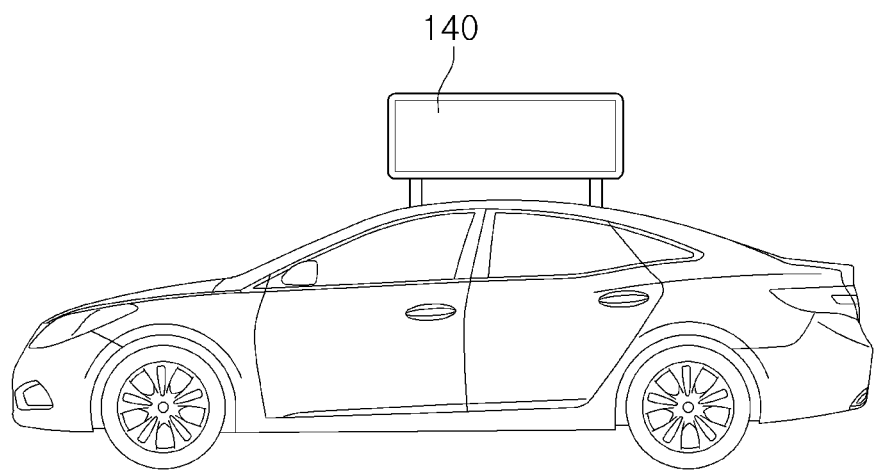

The vehicle 1 displays marking information for inducing a user possessing the mobile device 3 that has transmitted the call information through a first display 140 provided on an outer surface of the vehicle (see FIG. 4A, FIG. 4B, and FIG. 4C).

Herein, the marking information may include at least one of: identification information of a mobile device, user identification information of a mobile device, color information of the first display 140 provided on an exterior of the vehicle, number information, authentication information, guide text information, animation information, and quick response (QR) code information.

The vehicle 1 may transmit arrival information of the vehicle to the mobile device 3 in response to the distance to the mobile device 3 being less than or equal to the reference distance.

Figure 5:
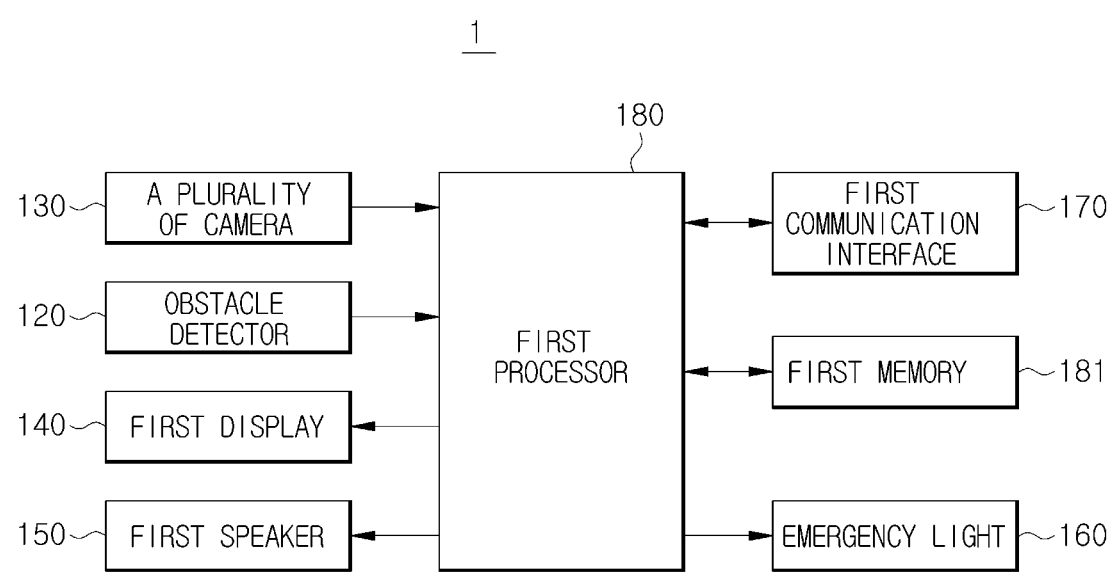
FIG. 5 is a view illustrating a control configuration of a vehicle.

In response to the distance to the mobile device 3 is less than or equal to a first reference distance, the vehicle 1 may turn on an emergency light 160 or output sound through a first speaker 150 (see FIG. 5).

The vehicle 1 may transmit the stopped position information for guiding a stopped position of the vehicle through video or audio to the mobile device 3 through communication with the mobile device 3.

The vehicle 1 may also transmit map information in which a moving route information from a current location of the mobile device 3 to a stopped position of the vehicle is matched through communication with the mobile device 3.

The vehicle 1 may receive current location information of the mobile device 3 from the server 2 or the infrastructure 4.

The server 2 may transmit call information of the mobile device 3 to vehicles and transmit identification information of a vehicle, among a plurality of vehicles, which responds to a call to the mobile device 3.

In response to a receipt of the call information of the mobile device 3, the server 2 may allocate a vehicle based on current location information of the mobile device 3, destination information, and current location information of the plurality of vehicles, and also transmit the current location information of the mobile device 3, the destination information, and identification information of the mobile device 3 to the allocated vehicle.

The server 2 may be a server at a service center, a manufacturer, or a maintenance center which manages the vehicle 1. In addition, the server 2 may be an application (i.e., app) server that provides services associated with the vehicle 1, and may be a telematics server or a platform server.

The mobile device 3 may communicate with the infrastructure 4, the server 2, and the vehicle 1.

The mobile device 3 may receive a user input, display various types of information corresponding to a request of the user, obtain the current location information of the mobile device 3 through a second location receiver, and transmit the obtained the current location information of the mobile device 3 to at least one of the vehicle 1, the server 2, and the infrastructure 4.

The mobile device 3 may contain an application for calling a vehicle.

The application of the mobile device 3 may be an application program configured for performing communication with the surrounding vehicles 1, the server 2, and the infrastructure 4 and exchanging various information through the communication.

The mobile device 3 may transmit vehicle call information to at least one of the infrastructure 4 and the server 2 in response to the execution of the application.

The mobile device 3 may transmit the current location information of the mobile device 3 and the destination information to the server 2 together when transmitting the vehicle call information.

The mobile device 3 may also transmit the current location information of the mobile device 3 and the destination information to the plurality of vehicles 1 when transmitting the vehicle call information.

The mobile device 3 may receive the stopped position information of the vehicle from the vehicle 1 that responds to the call, and display the received stopped position information of the vehicle.

When displaying the stopped position information of the vehicle, the mobile device 3 may match and display surrounding monitoring view information and the current location information of the vehicle.

When displaying the stopped position information of the vehicle, the mobile device 3 may display surrounding environment information of the vehicle that responds to the call and marking information displayed on the vehicle together.

The mobile device 3 may display the stopped position information of the vehicle through an augmented reality (AR) mode while the application is running.

The AR mode is a mode in which virtual information (e.g., text, image, etc.) is synthesized and output to a real object (e.g., real environment). Such the AR mode may provide a user with additional information that is difficult to obtain from real environments alone by providing virtual related objects on top of real-world objects.

The mobile device 3 may also receive identification information of a bus available for boarding (or getting on). The identification information of the bus may be a bus number.

The mobile device 3 may also receive identification information of taxis available for boarding (or getting into).

The mobile device 3 may also receive marking information displayed on the first display 140 of the vehicle available for boarding (or riding).

The mobile device 3 may guide a user possessing the mobile device to board efficiently and intuitively by receiving and displaying the marking information of the vehicle.

The mobile device 3 may be implemented as a computer or portable terminal capable of accessing the vehicle 1 through a network. Herein, the computer may include, for example, a laptop equipped with a web browser, a desktop, a tablet personal computer (PC), and a slate PC, and the like. The portable terminal is, for example, a wireless communication device that ensures portability and mobility, and may include all kinds of handheld-based wireless communication devices, such as personal communication system (PCS), global system for mobile (GSM) communications, personal digital cellular (PDC), personal handy phone system (PHS), personal digital assistant (PDA), international mobile telecommunication (IMT)-2000, code division multiple access (CDMA)-2000, W-CDMA, wireless broadband internet (WiBro) terminal, or smart phone, or the like, and a wearable device, such as, a watch, ring, bracelet, anklet, necklace, glasses, contact lens, or head-mounted-device (HMD), or the like.

The infrastructure 4 may receive the electromagnetic waves emitted from the antenna 1a of the vehicle 1 through an antenna 4a, and obtain information provided by the vehicle 1 or generate control signals, by using electrical signals corresponding to the received electromagnetic waves.

The infrastructure 4 may be connected to an external server 2 through a separate cable.

In response to a receipt of electrical signals from the server 2, the infrastructure 4 may convert the received electrical signals into control signals or information, convert the converted control signals or information into electromagnetic waves, and emit the converted electromagnetic waves through the antenna 4a. At this time, vehicles near the infrastructure 4 may receive the electromagnetic waves emitted from the infrastructure 4.

The infrastructure 4 may receive the identification information of the mobile device 3, the current location information of the mobile device 3, the destination information, and the call information.

The current location information of the mobile device 3 may be location information of a mobile device owned by a pedestrian or a passenger of a bus or taxi, and also means location information of a pedestrian or passenger.

The infrastructure 4 may transmit the identification information of the assigned vehicle and the marking information of the vehicle to the mobile device 3.

The infrastructure 4 may be installed at and around stops where buses or taxis stop.

The infrastructure 4 may be installed on sidewalks, street trees, or streetlights around roads.

The infrastructure 4 may assign different marking information to the plurality of vehicles entering the stop and transmit the marking information assigned to each vehicle.

Figure 2:
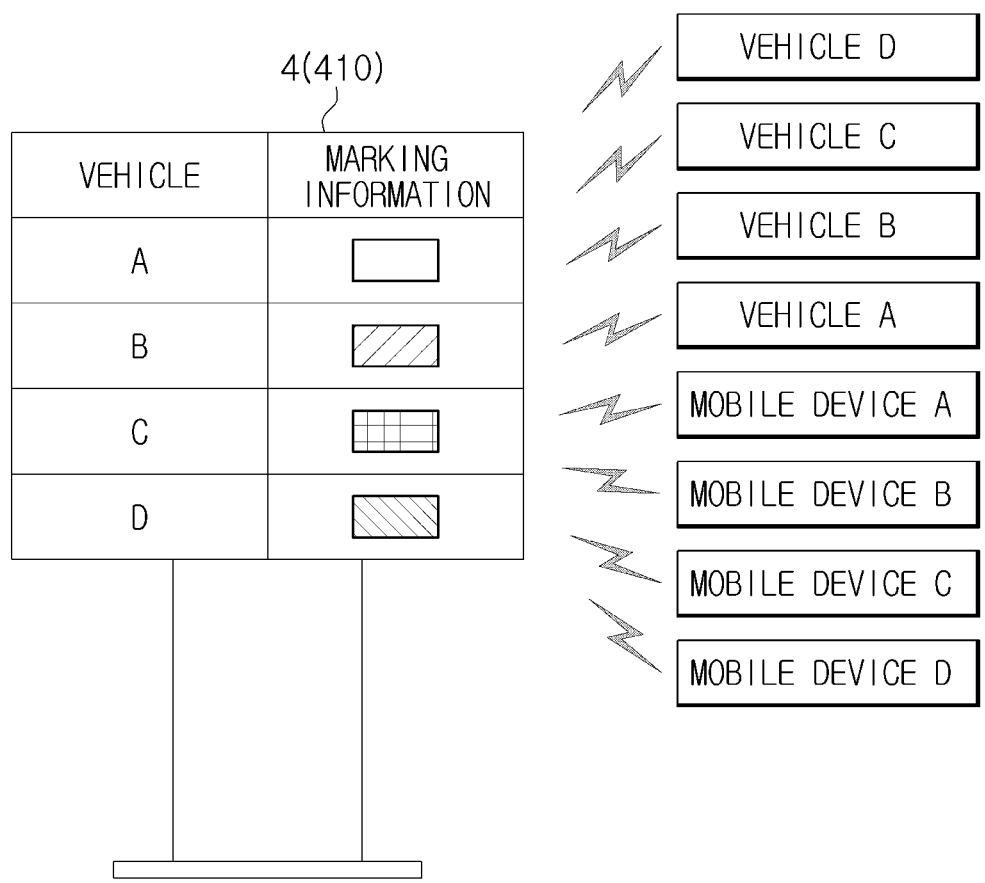
FIG. 2 is a view illustrating a display panel of an infrastructure that communicates with a vehicle.

As shown in FIG. 2, if the infrastructure 4 is provided at a stop, the infrastructure 4 may include a display panel 410. The infrastructure 4 may display the marking information assigned to each vehicle entering the stop through the display panel 410.

At this time, each vehicle entering the stop may display the marking information transmitted from the infrastructure 4 through the first display 140. Herein, the vehicle entering the stop may be a vehicle called by the user possessing the mobile device.

The mobile device 3 may display the marking information assigned to the vehicle responded to the call.

The mobile device 3 may also display the identification information of the vehicle responded to the call.

The infrastructure 4 may also receive the current location information of the vehicle 1 and also transmit the location information of the infrastructure 4 to the vehicle 1.

When the infrastructure 4 is provided at a bus stop, the infrastructure 4 may determine whether a passenger exists at the bus stop based on communication with a mobile device, and upon determining that a passenger exists at the bus stop, identify the vehicle 1 entering the bus stop and transmit presence information of the passenger to the identified vehicle.

The infrastructure 4 may obtain the distance information with the vehicle based on the location information transmitted from the vehicle 1 and the location information of the infrastructure, and transmit the presence information of the passenger based on the obtained distance information.

Figure 3:
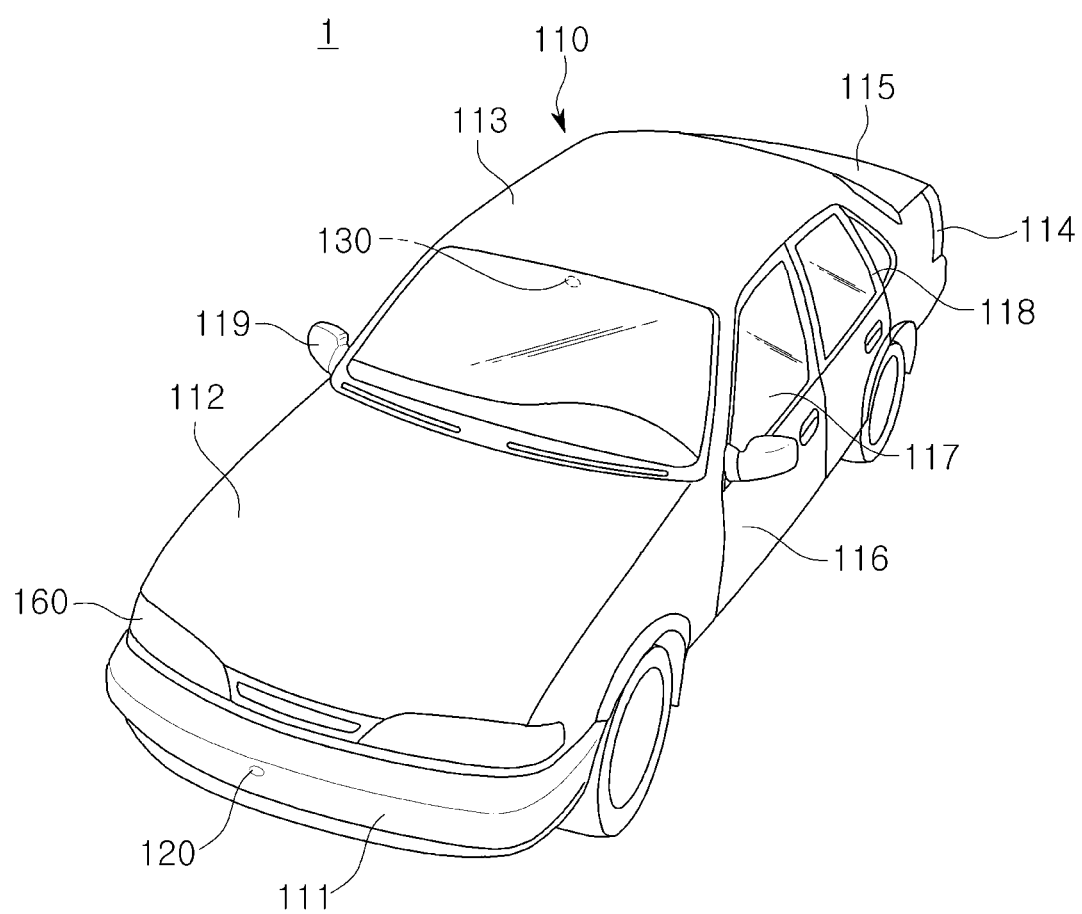
FIG. 3 is a view illustrating an external view of a vehicle.

FIG. 3 is a view illustrating an exterior of a vehicle, and will be described with reference to FIG. 4A, FIG. 4B, and FIG. 4C.

The vehicle 1 includes a body having interior and exterior parts, and a chassis in which mechanical devices required for driving are installed as the remaining parts except for the body.

As shown in FIG. 3, the exterior 110 of the vehicle body may include a front panel 111, a bonnet 112, a roof panel 113, a rear panel 114, a trunk 115, doors 116 (e.g., front left, front right, rear left, and rear right doors), and window glasses 117 provided on the doors 116 to be opened and closed.

Furthermore, the exterior of the vehicle body further includes pillars 118 provided at a front panel, a bonnet, a roof panel, a rear panel, a trunk, and boundaries between the window glasses, and side mirrors 119 that provides a driver with a backward field of view of the vehicle 1.

The vehicle 1 may further include an obstacle detector 120 for detecting obstacles in front, rear, left, and right directions, one or more cameras 130 for detecting surrounding images in the front, rear, left, and right directions, a plurality of wheel speed sensors for detecting speeds of the front, rear, left, and right wheels, an acceleration sensor for detecting acceleration of the vehicle, and an angular velocity sensor for detecting a steering angle of the vehicle.

Herein, the obstacle detector 120 may include a radar sensor or a light detection and ranging (LiDAR) sensor.

The obstacle detector 120 may be provided on at least one of the front panel 111 and the roof panel 113 of the vehicle.

One obstacle detector 120 may be provided at a center of the front panel 111, or three obstacle detectors may be provided at the left, right, and center of the front panel 111.

One or more cameras 130 may include a Charge-Coupled Device (CCD) image sensor or a Complementary Metal Oxide Semiconductor (CMOS) image sensor.

The cameras 130 may be provided on the front window glasses, but may be disposed on the window glasses inside the vehicle, disposed on the room mirror inside the vehicle, or provided on the roof panel 113 to be externally exposed thereto.

The cameras 130 may include a front camera 130a that obtains an image in a forward direction of the vehicle.

The front camera 130a may be a camera provided in a black box, a camera of an autonomous driving control device for autonomous driving, or a camera for detecting obstacles.

The cameras 130 may include a first camera 131 provided at a different position from the front camera 130a and obtaining a frontward image of the vehicle, a second camera 132 obtaining a rearward image of the vehicle, a third camera 133 obtaining an image in the left direction of the vehicle, and a fourth camera 134 obtaining an image in the right direction of the vehicle.

The first camera 131 may be disposed on a license plate, grill, emblem, front panel, or roof panel of the vehicle and externally exposed thereto.

The second camera 132 may be a camera of a rear detection device.

The second camera 132 is disposed p on the rear window glasses of the rear side of the vehicle, but may be provided on the rear window glasses inside the vehicle to face the outside of the vehicle, or disposed on a tailgate of the vehicle, but may be provided on a rear license plate, roof panel, rear panel or rear emblem of the vehicle and externally exposed thereto.

The third camera 133 may be disposed on a left side mirror, a left door, or a left fender.

The fourth camera 134 may be disposed on a right side mirror, a right door, or a right fender. Furthermore, the fourth camera 134 may be disposed around the rear panel, the emblem, or the license plate.

The first, second, third, and fourth cameras may be a camera of a surround monitoring device (e.g., surround view monitor (SVM) or around view monitor (AVM)), or a camera of a blind spot detection device (BSD).

The front camera and the first, second, third, and fourth cameras may convert shape information of objects around the vehicle into electrical image signals. For example, such cameras may transmit an image signal corresponding to shape information of objects in front of, behind, left and right of a host vehicle in the environment outside the host vehicle, in particular a road on which the vehicles are traveling and their surroundings, from a current position of the host vehicle to the image processing device.

As shown in FIG. 4A, FIG. 4B, and FIG. 4C, the vehicle may further include the first display 140 disposed on an outer surface of the vehicle. The outer surface of the vehicle may include at least one of the front panel, roof panel, and rear panel of the vehicle.

As shown in FIG. 4A, the vehicle may display the marking information through the first display 140, and display text as the marking information for inducing a user owning a mobile device.

As shown in FIG. 4B, the vehicle may display the marking information through the first display 140, and may display a first color as the marking information for inducing a user possessing a mobile device.

The vehicle may display an entire surface of the first display 140 in the first color for a certain period of time, display the entire surface of the first display 140 in the first color but periodically flicker, or display an emoticon having the first color on a portion of the first display 140.

As shown in FIG. 4C, the vehicle may display the identification information of the mobile device, the identification information of the user possessing the mobile device, and the authentication number information transmitted to the mobile device, through the first display 140, and display the QR code information recognizable by the mobile device requesting the call.

The vehicle 1 may further include the first speaker 150 (see FIG. 5) that is provided to be exposed externally thereto and outputs sound.

The vehicle may further include the emergency light 160 that is turned on in an emergency.

The emergency light 160 may be turned on or off in response to a user input, and may be turned on when it is automatically determined to be an emergency situation.

The emergency light 160 may be automatically turned on in order to identify the vehicle from other vehicles. In this case, the position of the vehicle may be revealed as the emergency light 160 is turned on.

The interior of the vehicle body may include a seat on which an occupant sits, a dashboard, and a cluster disposed on the dashboard.

The vehicle may further include a terminal for vehicle that performs an audio mode, a video mode, a navigation mode, a digital multimedia broadcasting (DMB) mode, and a radio mode, and displays map information, route information, and route guidance information in the navigation mod.

The terminal for vehicle may include a display panel and may include a touch screen in which a touch panel is integrated with the display panel. When the terminal has only the display panel, an input device of the head unit may allow a button displayed on the terminal to be selected.

FIG. 5 is a view illustrating a control configuration of a vehicle, and will be described with reference to FIG. 6.

The vehicle 1 includes the obstacle detector 120, the plurality of cameras 130, the display 140, the speaker 150, a first communication interface 170, a first processor 180, and a first memory 181.

To differentiate the components of the vehicle 1 from the components of the mobile device 3, among the components with the same name, the components provided in the vehicle 1 may be denoted as the first, and the components provided in the mobile device 3 may be denoted as the second.

The obstacle detector 120 may detect obstacles around the vehicle and transmit the detected obstacle information to the first processor 180. The obstacle information may include location information of the obstacle and shape information of the obstacle.

The location information of the obstacle may include distance information with the obstacle and direction information of the obstacle.

The obstacle detector 120 may include one or more radar sensors.

If the vehicle is provided with two or more radar sensors, the two or more radar sensors may include a front radar sensor having a field of sensing toward the front of the vehicle 1, and a plurality of corner radar sensors having a field of sensing toward the left and right front sides of the vehicle and the left and right rear sides of the vehicle.

Radar data obtained by the front radar sensor may be used to recognize location information and speed levels of other vehicles or pedestrians or cyclists located in front of the vehicle 1.

Radar data obtained by each of the plurality of corner radar sensors may be used to recognize location information and speed levels of other vehicles, pedestrians, or cyclists located on the left and right front sides and left and right rear sides of the vehicle 1.

The obstacle detector 120 may include one or more LiDAR sensors.

The LiDAR sensors are non-contact distance detection sensors using the principle of laser radar.

The LiDAR sensors may include a transmitter for transmitting a laser and a receiver for receiving the laser that is reflected on a surface of an obstacle existing within the range of the sensor and returned.

The LiDAR sensor has higher detection accuracy in a lateral direction than a radio detecting and ranging (RaDAR) sensor.

The obstacle detector 120 may include one or more ultrasonic sensors.

One or more ultrasonic sensors may be used to determine the presence or absence of obstacles, such as pedestrians within a short range.

The cameras 130 may be one or two or more.

One or two or more cameras 130 may be full high definition (FHD) cameras for image processing.

One or two or more cameras may include a CCD or CMOS image sensor, and may include a three dimension (3D) spatial recognition sensor, such as a KINECT (e.g., RGB-D sensor), a time of flight (TOF) (e.g., Structured Light Sensor), and a stereo camera, and the like.

Two or more cameras may be disposed at different positions of the body of the vehicle 1.

One or two or more cameras 130 may include CCD or CMOS image sensors.

For example, the two or more cameras may include the front camera 130a and the first, second, third, and fourth cameras 131 to 134 for monitoring surroundings.

The front camera 130a may be disposed on the front windshield glass, but may be provided on the windshield glass inside the vehicle, provided on the room mirror inside the vehicle, or provided on the roof panel 113 to be externally exposed thereto.

The front camera 130a may obtain an image in a forward direction of the vehicle.

The front camera 130a may obtain a forward image for recognizing the shape information of the objects, such as other vehicles, pedestrians, cyclists, lanes, curbs, guardrails, street trees, and streetlights located in front of the vehicle 1 and location information of at least one object.

The front camera 130a may be a camera disposed in a black box, a camera of an autonomous driving control device for autonomous driving, or a camera for detecting obstacles.

The first camera 131 may be disposed at a different location from the front camera 130a, and may be disposed on a license plate, grill, emblem, front panel or roof panel of the vehicle and externally exposed thereto.

The second camera 132 may be a camera of a rear detection device.

The second camera 132 is disposed on the rear windshield glass of the rear side of the vehicle, but may be provided on the rear windshield class inside the vehicle to face the outside of the vehicle, provided on a tailgate, or provided on a rear license plate, roof panel, rear panel or rear emblem of the vehicle and externally exposed thereto.

The third camera 133 may be disposed on a left side mirror, a left door, or a left fender.

The fourth camera 134 may be disposed on a right side mirror, a right door, or a right fender. In addition, the fourth camera may be disposed around the rear panel, the emblem, or the license plate.

The first camera 131 may obtain an image in the front direction of the vehicle, the second camera 132 may obtain an image in the rear direction of the vehicle, the third camera 133 may obtain an image in the left direction of the vehicle, and the fourth cameras 134 may obtain an image in the right direction of the vehicle.

The first, second, third, and fourth cameras 131 to 134 may be classified into a front camera, a right side camera, a left side camera, and a rear camera according to the field of view toward which the camera is directed.

The first, second, third, and fourth cameras 131 to 134 may be a SVM camera, an AVM camera, or a BSD camera.

The front camera 130*a* and the first, second, third, and fourth cameras 131-134 may convert shape information of objects around the vehicle into electrical image signals. For example, such cameras may transmit an image signal corresponding to shape information of objects in front of, behind, left and right of a host vehicle in the environment outside the host vehicle, in particular a road on which the vehicles are traveling and their surroundings, from a current position of the host vehicle to the image processing device.

An image processing device may synthesize a plurality of images obtained from the front camera 130*a* and the first, second, third, and fourth cameras 131-134 and surrounding information of the vehicle, and store the synthesized image information. Herein, the surrounding information of the vehicle may include information of objects around the vehicle and driving information of the vehicle.

When the vehicle is a bus or a taxi, the first display 140 may display the marking information.

For a personal vehicle, an internal display provided inside the vehicle may display navigation information. Herein, the navigation information may include map information in which the current location information of the vehicle, the destination information, the route information, and the route guidance information are matched.

The first display 140 includes a cathode ray tube (CRT), a digital light processing (DLP) panel, a plasma display panel (PDP), a liquid crystal display (LCD) panel, an electroluminescence (EL) panel, an electrophoretic display (EPD) panel, an electro chromic display (ECD) panel, a light emitting diode (LED) panel, or an organic light emitting diode (OLED) panel, or the like, but is not limited thereto.

The first speaker 150 may output sound in response to a control instruction of the first processor 180.

The first speaker 150 may output sound to induce a user who owns the mobile device 3.

The first speaker 150 may output navigation information as sound including voice.

The first speakers 150 may be one or two or more.

The first speaker 150 may be provided inside the vehicle to output sound to the inside of the vehicle.

The first speaker 150 may be provided to be exposed to the outside of the vehicle to output sound to the outside of the vehicle.

The emergency light 160 may be turned on or off in response to a user instruction.

The emergency light 160 may be turned on in response to the vehicle being in an emergency state.

The emergency light 160 may be automatically turned on or off in response to a control instruction from the first processor. For example, the emergency light 160 may be automatically turned on when the distance with the mobile device 3 requesting a call is less than a certain distance, and may be automatically turned off when the user possessing the mobile device 3 has gotten on.

Herein, the certain distance is a distance shorter than a first reference distance.

The first communication interface 170 may communicate with at least one of the server 2, the infrastructure 4, and the mobile device 3.

The first communication interface 170 may transmit various types of information transmitted from the infrastructure 4, the second terminal 3, and the server 2 to the first processor 180, and based on a control instruction of the first processor 180 transmit various types of information to at least one of the infrastructure 4, the mobile device 3 and the server 2.

The first communication interface 170 may transmit the current location information, route information, and destination information of the vehicle to the server 2 and the infrastructure 4 based on a control instruction of the first processor 180.

The first communication interface 170 may also receive location information of the mobile device 3 from the infrastructure 4. Herein, the location information of the mobile device 3 may be location information of pedestrians or passengers.

The first communication interface 170 may include one or more components enabling communication with the internal components of the vehicle 1 and various external devices. For example, the first communication interface may include at least one of a short-distance communication module, a wired communication module, and a wireless communication module.

The short-distance communication module may include various short-distance communication modules for transmitting and receiving signals using a wireless communication network in a short distance such as a Bluetooth module, an infrared communication module, a Radio Frequency Identification (RFID) communication module, a Wireless Local Access Network (WLAN) communication module, a Near Field Communication (NFC) module, and a Zigbee communication module, and the like.

The wired communication module may include a variety of wired communication modules such as a Controller Area Network (CAN) communication module, a Local Area Network (LAN) module, a Wide Area Network (WAN) module, or a Value Added Network (VAN) module, and the like, and various cable communications such as Universal Serial Bus (USB), High Definition Multimedia Interface (HDMI), Digital Visual Interface (DVI), Recommended Standard 232 (RS-232), power line communication, and Plain Old Telephone Service (POTS), and the like.

The wired communication module may further include a Local Interconnect Network (LIN).

The wireless communication module may include a wireless communication module supporting various wireless communication methods such as a Wireless Fidelity (Wifi) module, a Wireless Broadband (WiBro) module, Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), and Ultra Wide Band (UWB), and the like.

The first communication interface 170 may perform an Ultra Wide Band (UWB) communication for determining a precise location of a user around the vehicle responded to a call.

The first communication interface 170 may further include a first location receiver that receives location information regarding the current location of the vehicle and outputs the received location information.

The first location receiver may include a Global Positioning System (GPS) receiver. Herein, the GPS receiver includes an antenna module for receiving signals from a plurality of GPS satellites and a signal processing module.

The signal processing module may include software for acquiring a current location using distance and time information corresponding to location signals of the plurality of GPS satellites, and a transmitter for transmitting the obtained location information of the vehicle.

The first processor 180 may determine the current location information of the vehicle received through the first communication interface as location information of a departure, search for a route to the current location of the mobile device based on the current location information of the mobile device and the location information of the departure received by the first communication interface, and control autonomous driving to the current location of the mobile device based on route information, road information, and map information on the searched route.

Upon determining that the passenger has gotten on, the first processor 180 may search for a route from the current location of the vehicle to a destination based on the destination information and the current location information of the vehicle received from the first communication interface 170, match the route information for the searched route and the road information with the map information, generate navigation information from the map information in which the route information and the road information are matched, and control autonomous driving based on the generated navigation information. Herein, the road information may include route guidance information.

The first processor 180 may control an internal display and the first speaker 150 disposed inside the vehicle so as to output the navigation information.

When controlling autonomous driving based on the navigation information, the first processor 180 may recognize a lane based on image information obtained from the front camera 130a, and control autonomous driving to follow the recognized lane.

When controlling autonomous driving based on the navigation information, the first processor 180 may recognize the obstacles based on the image information acquired from the front camera 130a and the first, second, third, and fourth cameras 131 to 134 and obstacle information detected by the obstacle detector, and avoid the recognized obstacle When recognizing obstacles, the first processor 180 may recognize location information (direction) and type information of obstacles (e.g., whether obstacles are other vehicles, pedestrians, cyclists, curbs, guardrails, street trees, or street lamps).

When avoiding obstacles, the first processor 180 may control at least one of steering, acceleration, and deceleration.

The first processor 180 may control autonomous driving while controlling acceleration and deceleration based on speed limit information included in road information and preset target driving speed information.

In detail, the first processor 180 may obtain the location information (distance and direction) and the speed information (relative speed) of obstacles in front of the vehicle 1 based on front radar information of the front radar.

The first processor 180 may match the obstacles detected by front image information with the obstacles detected by the front radar information, and based on the matching result, obtain the type information, location information, and speed information on front obstacles of the vehicle 1.

The first processor 180 may generate a braking signal and a steering signal based on the type information, location information, and speed information of the front obstacles.

For example, the first processor 180 may calculate a time to collision (TTC) between the vehicle 1 and the front obstacle based on the location information (i.e., relative distance) and speed information (i.e., relative speed) of the front obstacles, and based on the comparison result between the TTC and a predetermined reference time, warn a driver of a collision, transmit a braking signal to a braking device, or transmit a steering signal to a steering device.

The first processor 180 may calculate a distance to collision (DTC) based on the speed information (i.e., relative speed) of the front obstacles, and based on the comparison result between the DTC and the distance to the front obstacles, warn a driver of a collision or transmit a braking signal to a braking device.

The first processor 180 may recognize the obstacles located on the sides of the vehicle 1 (e.g., right front, left front, right rear, and left rear) based on corner radar data of the plurality of corner radars, and obtain the location information (i.e., distance and direction) and speed information (i.e., relative speed) of the recognized obstacles.

The first processor 180 may obtain the current location information of the vehicle based on the plurality of GPS satellite signals received by the first communication interface 170, and transmit the obtained current location information to the server 2, infrastructure 4, or the mobile device 3.

If the vehicle is a bus, the first processor 180 may transmit route information of the vehicle, location information of a stop to be stopped, and identification information of the stop, to the server 2, the infrastructure 4, or the mobile device 3.

If the vehicle is a bus, the first processor 180 may control the internal display and the first speaker 150 to output the route information of the vehicle, the location information of a stop to be stopped, and the identification information of the stop.

The first processor 180 may obtain distance information between the vehicle and the mobile device based on the current location information of the vehicle and the current location information of the mobile device, determine, based on the obtained distance information, whether the distance between the vehicle and the mobile device is less than or equal to the reference distance, and in response to the distance between the vehicle and the mobile device being less than or equal to the first reference distance, transmit arrival information to the mobile device 3.

In response to the distance between the vehicle and the mobile device being less than or equal to the first reference distance, the first processor 180 may control the first display 140 to display the marking information.

The first processor 180 may also control the first display 140 to display the marking information transmitted from the infrastructure 4.

When the vehicle 1 is a bus and the infrastructure 4 is provided at a stop, the first processor 180 may obtain the distance information between the vehicle and the infrastructure based on the current location information of the vehicle and the location information of the infrastructure, and based on the distance information determine whether the distance between the vehicle and the infrastructure is less than or equal to a second reference distance.

Figure 6:
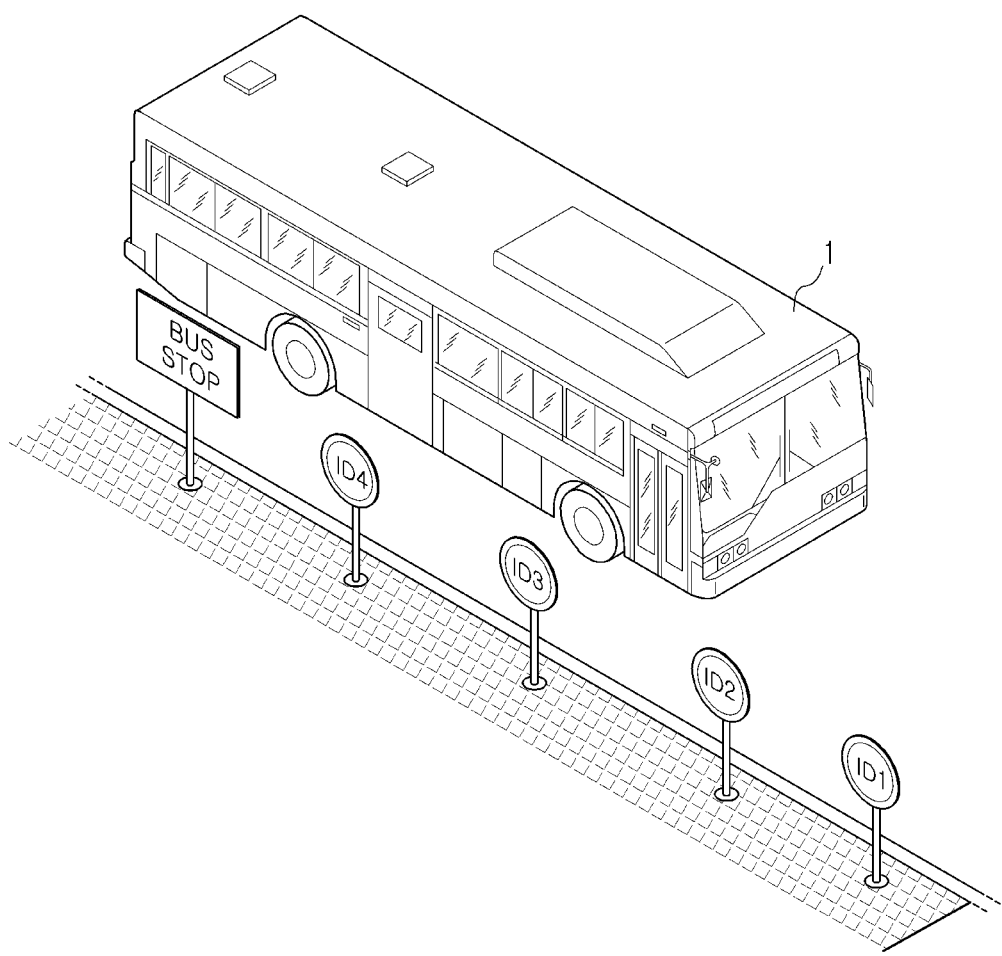
FIG. 6 is a view illustrating an identifier of a stop where a vehicle stops.

As shown in FIG. 6, upon determining that the distance between the vehicle 1 and the infrastructure 4 is less than or equal to the second reference distance, the first processor 180 may obtain an identifier image for an identifier provided at a bus stop through the front camera 130a, and transmit the obtained identifier image to the mobile device 3.

The identifier of a stop may be provided on a floor of the stop or on a sign at the stop.

For example, upon determining that identifier information is obtained through the identifier image and the obtained identifier information is ID3, the first processor 180 may transmit the identifier information of ID3 to the mobile device. Accordingly, a user possessing the mobile device may easily recognize a location where a vehicle is stopped.

Furthermore, the first processor 180 may identify the marking information of any other vehicles existing in a preset area based on the current location information of the vehicle and preset area information, obtain marking information different from the identified marking information of other vehicles among multiple marking information, and control the first display 140 to display the marking information of the obtained vehicle.

The first processor 180 may transmit the marking information of the obtained vehicle to the mobile device 3.

Furthermore, the first processor 180 may count a time from when the vehicle stops at a stop, compare the counted time with a preset time, and in response to the counted time falling within the preset time control the first display 140 so that the marking information of the vehicle is displayed and in response to the counted time passing the preset time control the first display 140 so that displaying of the marking information of the vehicle is terminated.

Upon determining that a calling user is before getting on, the first processor 180 may generate a surrounding monitoring view image based on the image information obtained from the first, second, third, and fourth cameras, and transmit the generated surrounding monitoring view image to the infrastructure 4 or the mobile device 3.

Upon determining that the calling user is before getting on, the first processor 180 may generate a 360-degree variable view image based on the image information obtained from the first, second, third, and fourth cameras, and transmit the generated 360-degree variable view image to the infrastructure 4 or the mobile device 3.

The first processor 180 may transmit the surrounding monitoring view image and the 360-degree variable view image of the vehicle to the mobile device 3. Accordingly, the user possessing the mobile device may easily recognize the objects around the vehicle, the appearance of the vehicle, and the detailed location of the vehicle.

The first processor 180 may generate, based on the current location information of the vehicle, the road information, and the map information, the map information in which the current location information of the vehicle and the road information are matched, and transmit the generated map information to the mobile device 3.

When transmitting the map information to the mobile device 3, the first processor 180 may also transmit an image of the surroundings of the vehicle acquired by a camera, and upon determining that business name information of a nearby building exists in the map information, transmit the business name information together.

The first processor 180 may also obtain information on a relative distance and a relative direction to the mobile device based on the current location information of the vehicle and the current location information of the mobile device, and recognize, based on the obtained relative distance and relative direction, a surface of the vehicle facing the user possessing the mobile device and transmit an image of a view corresponding to the recognized surface to the mobile device.

The first processor 180 may obtain relative direction information with the vehicle based on the current location information of the mobile device and the current location information of the vehicle, identify a camera corresponding to the obtained relative direction information, and transmit the view image acquired by the identified camera to the mobile device 3 as an initial view image.

The first processor 180 may obtain distance information between the vehicle and the stop based on the current location information of the vehicle and the location information of the infrastructure of the stop, and based on the obtained distance information and preset distance information transmit marking information or view image information to the mobile device.

For example, the first processor 180 may transmit the marking information or the view image information to the mobile device when the distance from the bus stop reaches 500 m before entering the bus stop.

The first processor 180 may obtain the distance information between the vehicle and the stop based on the current location information of the vehicle and the location information of the infrastructure 4 of the stop, predict an arrival time based on the obtained distance information and driving speed information of the vehicle, and based on the predicted time and a preset time transmit the marking information or view image information to the mobile device.

Herein, the driving speed information of the vehicle may be preset driving speed information or driving speed information detected by at least one of a plurality of wheel speed sensors and an acceleration sensor.

For example, the first processor 180 may transmit the marking information or the view image information to the mobile device 3 minutes before entering the bus stop.

In addition to the surrounding monitoring view image or the 360-degree variable view image, the first processor 180 may transmit a view image obtained from one camera or a view image obtained by combining images obtained from two or more cameras, to the mobile device 3.

The first processor 180 may process images acquired by the plurality of cameras and transmit only images whose distortion is less than or equal to a preset distortion among the processed images to the mobile device 3.

In other words, the first processor 180 may transmit the marking information displayed on the first display 140 of the vehicle and the view image of the vehicle to the mobile device, which allows the user possessing the mobile device to easily recognize the vehicle responded to the call.

The first processor 180 may include an image signal processor processing image data of the cameras 130 and/or a digital signal processor processing radar data of radars and/or a micro control unit (MCU) generating a braking signal.

The first processor 180 may be implemented by the first memory 181 that stores data for algorithms or programs that reproduces an algorithm for controlling operation of the components in the vehicle and the first processor that performs the above-described operation using the data stored in the first memory.

The first memory 181 may store the identification information of the vehicle.

The first memory 181 may store the route information and may store information regarding the preset time, the preset distance, and the first and second reference distances.

The first memory 181 stores the map information and the road information.

The map information may include location information of a road, location information of buildings around the road, location information of bus stops, and identification information of bus stops, and the like. The road information may include location information of street trees near intersections, left, right, and U-turns, location information of buildings, loading information such as construction goods, and location information of banners, and the like.

The first memory 181 may store a program and/or data for processing LiDAR data, a program and/or data for processing radar data, and a program and/or data for the first processor 180 to generate a braking signal and/or a warning signal.

The first memory 181 may temporarily stores the image data received from the cameras 130 and/or the radar data received from the radars of the obstacle detector, and also temporarily store the processing result of the image data and/or radar data in the first memory 181.

The first memory 181 may be a memory implemented as a separate chip from the first processor 180 described above in associated with the first processor 180, or may be implemented as a single chip with the processor.

The first memory 181 may be implemented as at least one of a nonvolatile memory device such as a cache, a read only memory (ROM), a programmable ROM (PROM), an erasable programmable ROM (EPROM), an electrically erasable programmable ROM (EEPROM), and flash memory, or a volatile memory device such as a random-access memory (RAM), or a storage medium such as a hard disk drive (HDD) and a CD-ROM, but is not limited thereto.

Meanwhile, each component shown in FIG. 5 refers to software and/or hardware components, such as a Field Programmable Gate Array (FPGA) and an Application Specific Integrated Circuit (ASIC).

At least one component may be added or deleted according to performance of the authentication device and the vehicle components shown in FIG. 5. Furthermore, it will be readily understood by those of ordinary skill in the art that the mutual positions of the components may be changed corresponding to the performance or structure of the system.

Figure 7:
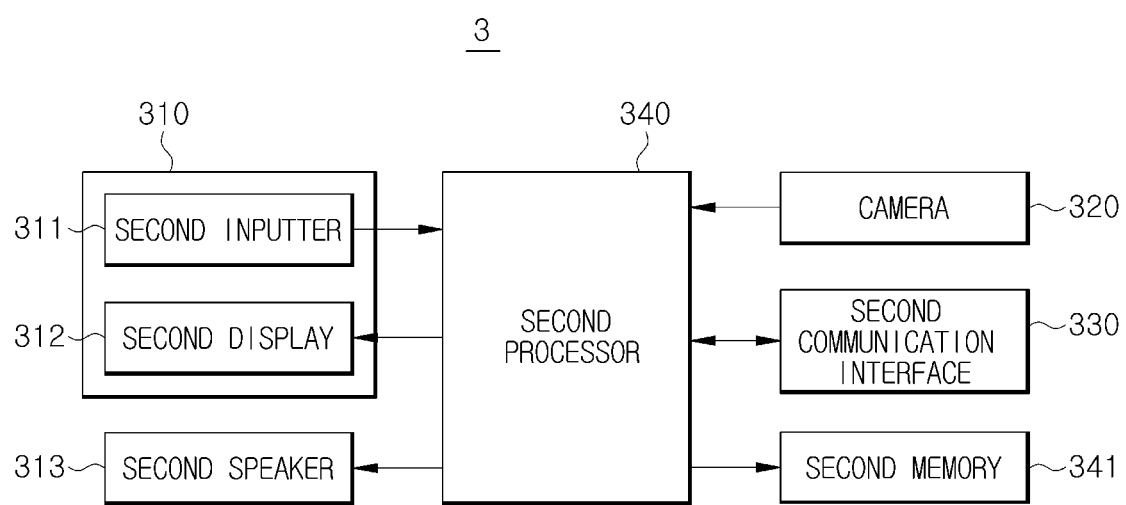
FIG. 7 is a view illustrating a control configuration of a mobile device communicating with a vehicle.

FIG. 7 is a view illustrating a control configuration of the mobile device 3 communicating with a vehicle, and will be described with reference to FIG. 8 to FIG. 10.

The mobile device may include a user interface 310, a second speaker 313, a camera 320, a second communication interface 330, a second processor 340, and a second memory 341.

The user interface 310 may receive a user input and display information on various functions performed in the mobile device.

The user interface 310 may include a second inputter 311 and a second display 312.

The second inputter 311 may receive the user input.

The second inputter 311 may receive an execution instruction of an application.

The second inputter 311 may receive call information and display request information.

The second inputter 311 may receive selection information of any one view image among various view images.

The second inputter 311 may receive destination information.

The second inputter 311 may also receive a selection signal of one of a plurality of stops displayed on the second display.

The second inputter 311 may receive an instruction to transmit current location information of the mobile device 3.

The second display 312 may display location information of stops around the mobile device 3. In this case, the second display 312 may match current location information of the mobile device and location information of the stops with map information to display.

The second display 312 may display an execution image of an application.

The second display 312 may display identification information of the vehicle responded to a call, display marking information of the vehicle, and a view image of the vehicle.

The second display 312 may display a moving route to the vehicle responded to the call as an image.

The second speaker 313 may output the location information of the stops around the mobile device 3 as voice.

The second speaker 313 may output the identification information of the vehicle responded to the call in voice and output the marking information of the vehicle in voice.

The second speaker 313 may output the moving route to the vehicle responded to the call as voice.

The camera 320 may obtain an image of surroundings of the mobile device.

The cameras 320 may be one or two or more.

The cameras 320 may include a CCD image sensor or a CMOS image sensor.

The second communication interface 330 may include one or more components enabling communication between an external device and internal components of the mobile device, and for example, may include at least one of a short-distance communication module, a wired communication module, and a wireless communication module.

Examples of the short-distance communication module, the wired communication module, and the wireless communication module of the second communication interface 330 are the same as those of the short-distance communication module, the wired communication module, and the wireless communication module of the first communication interface, so descriptions thereof are omitted.

The second communication interface 330 may further include a second location receiver that receives location information on the current location of the mobile device and outputs the received location information.

The second location receiver may include a GPS receiver. Herein, the GPS receiver may include an antenna module for receiving signals from a plurality of GPS satellites and a signal processing module.

The signal processing module includes software for acquiring a current location using distance and time information corresponding to location signals of the plurality of GPS satellites, and a transmitter for transmitting the obtained location information of the vehicle.

In response to the receipt of arrival information from the vehicle 1 or the infrastructure 4, the second processor 340 may control at least one of the second display and the second speaker in order to output the received arrival information.

For example, the second processor 340 may allow the second display 312 to display guidance information (or boarding guidance information) saying 'The vehicle has arrived. Please get on the vehicle displaying XX on the first display of the vehicle'.

The second processor 340 may receive the surrounding monitoring view image of the vehicle transmitted from the vehicle 1 or the infrastructure 4 before the user gets on, and control the second display 312 to display the received surrounding monitoring view image.

The second processor 340 may receive the 360-degree variable view image transmitted from the vehicle 1 or the infrastructure 4 before the user gets on, and control the second display 312 to display the received 360-degree variable-view image.

In response to a user input being received through the second inputter 311 while an image in a first angle direction among the 360-degree variable view image is displayed, the second processor 340 may control the second display 312 to display an image in a second angle direction among the 360-degree variable view image displayed corresponding to the received user input.

The second processor 340 may display the 360-degree variable view image displayed in response to the user input by rotating it, or by enlarging or reducing its size.

Figure 8:
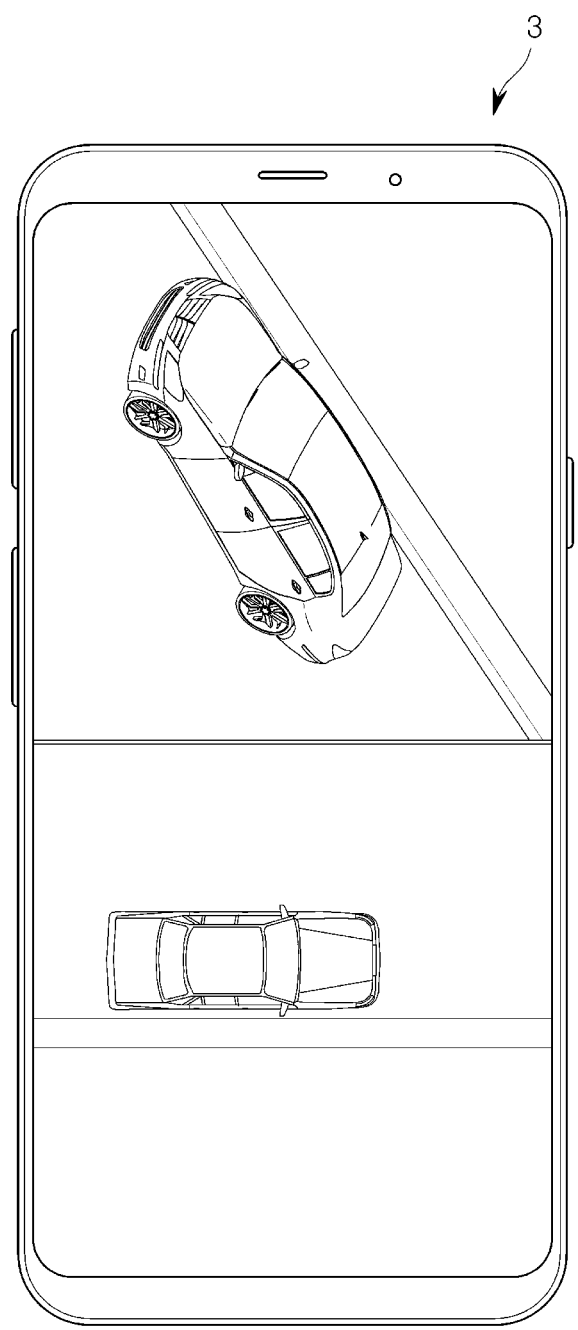
FIG. 8 is a view illustrating a view image displayed through a display of the mobile device shown in FIG. 7.

As shown in FIG. 8, the second processor 340 may also control the second display 312 to simultaneously display the surrounding monitoring view image and the 360-degree variable view image.

The second processor 340 may request provision of a view image obtained by one camera or a view image obtained by combining images acquired by two or more cameras.

When the view image requested from the vehicle is received, the second processor 340 may control the second display 312 to display the received view image.

The second processor 340 may control at least one of the second display and the second speaker in order to output identifier information of the stop transmitted from the vehicle.

For example, the second processor 340 may control the second display to display guidance information saying 'The vehicle you called is stopping at ID3. Please get on the vehicle stopped at ID3'.

The second processor 340 may control the second display 312 to display the map information in which the current location information of the vehicle and the road information are matched.

Figure 9:
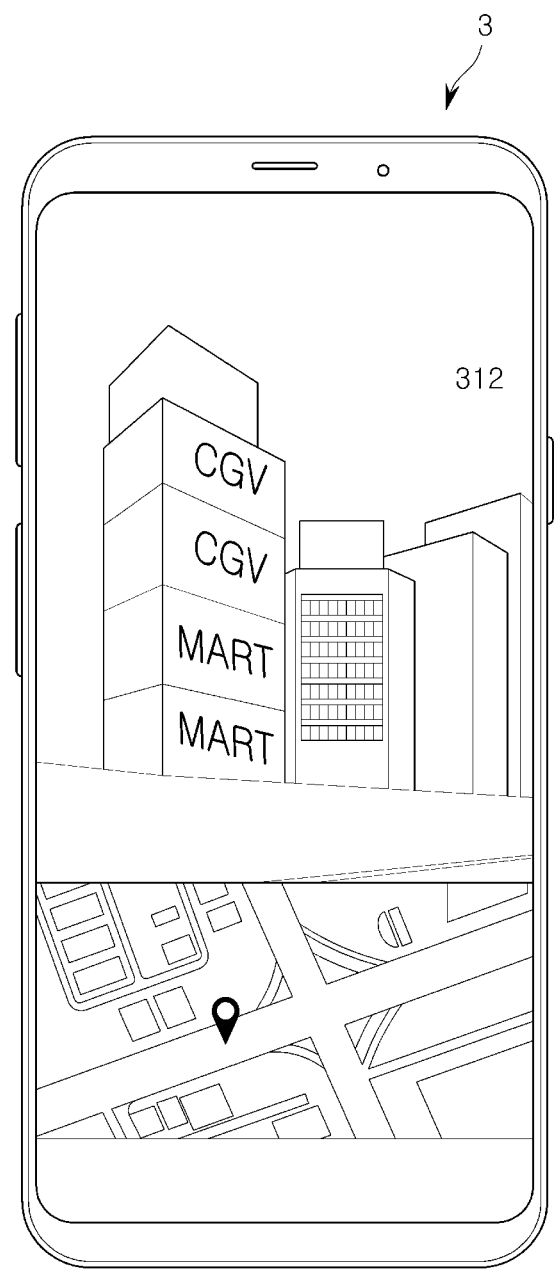
FIG. 9 is a view illustrating a view image and map information displayed through the display of the mobile device shown in FIG. 7.

As shown in FIG. 9, when the map information is received, along with images of surroundings of the vehicle and information on the business names of nearby buildings, the second processor 340 may control the second display 312 to display the received images of surroundings of the vehicle and the information on the business name of nearby buildings together.

The second processor 340 may obtain the distance information between the mobile device and the vehicle based on the current location information of the mobile device and the current location information of the vehicle, and control the second display 312 to display the obtained distance information.

When displaying the view image, the second processor 340 may control the second display 312 to display an initial view image transmitted from the vehicle.

After displaying the initial view image, the second processor 340 may control the second display 312 to display a view image corresponding to a user input.

The second processor 340 may control the second display 312 to display an image of the called vehicle based on the AR mode.

When the AR mode is selected, the second processor 340 may control activation of the cameras 320, recognize the vehicle displaying the marking information received from the image acquired by the cameras 320, and control the second display 312 to display the AR image displaying an indicator mark on the recognized vehicle.

The second processor 340 may indicate the called vehicle by using User Experience (UX) and Human Machine Interface (HMI) in the AR image.

The second processor 340 may indicate the called vehicle by using shadows, animations, mobile vibrations, or the like.

Figure 10:
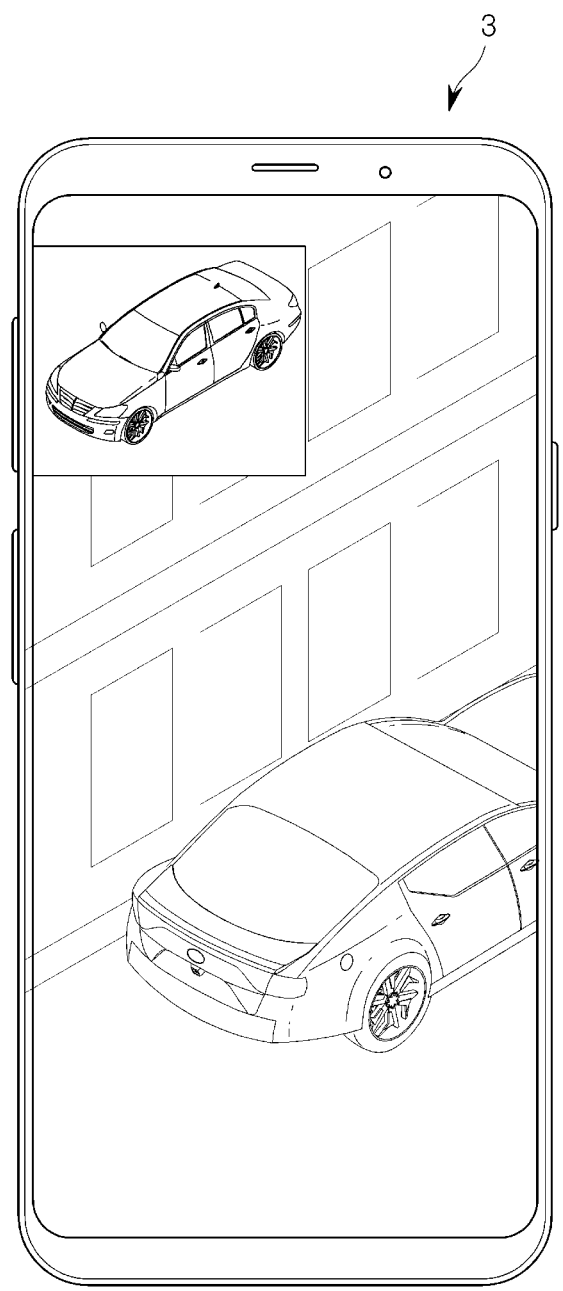
FIG. 10 is a view illustrating an augmented reality image displayed through the display of the mobile device shown in FIG. 7.

As shown in FIG. 10, the second processor 340 may control the second display to simultaneously display the AR image and the 360-degree variable view image.

Upon determining that the called vehicle does not exist in the AR image, the second processor 340 may recognize the object by analyzing the AR image, recognize a direction in which the vehicle is located based on the map information, the location information of the recognized object, and the current location information of the vehicle, and control the second display 312 to display an arrow image in the recognized direction.

The second processor 340 may obtain a matching rate of the image by comparing the 360-degree variable view image and the image of the camera 320, and finally determine the vehicle responded to the call based on the matching rate of the obtained image.

The second processor 340 may obtain the distance information between the mobile device and the vehicle based on the current location information of the mobile device and the location information of the vehicle, determine whether the distance to the vehicle falls within a certain distance based on the obtained distance information and the preset distance information, and upon determining that the distance to the vehicle falls within the certain distance, control at least one of generating vibration, outputting a notification, or changing a color of the second display.

In response to the receipt of the current location information of the mobile device transmitted from the mobile device 3, the second processor 340 may obtain the distance information between the infrastructure 4 and the mobile device 3 based on the location information of the infrastructure and the current location information of the mobile device.

The second processor 340 may determine whether the distance between the infrastructure 4 and the mobile device 3 is less than or equal to the first reference distance based on the distance information between the infrastructure 4 and the mobile device 3, and upon determining that the distance between the infrastructure 4 and the mobile device 3 is less than or equal to the first reference distance, transmit the current location information of the mobile device to the infrastructure 4.

The second processor 340 may include the second memory 341 that stores data for algorithms or programs reproducing algorithms for controlling operation of components in the mobile device 3, and perform the above-described operation using the data stored in the second memory.

The second memory 341 stores the identification information of the mobile device.

The second memory 341 may store applications.

The second memory 341 may store a program and/or data for processing a vehicle call and a program and/or data for processing an execution of applications.

The second memory 341 may be a memory implemented as a separate chip from the second processor 340 described above in associated with the second processor 340, or may be implemented as a single chip with the processor.

The second memory 341 may be implemented as at least one of a nonvolatile memory device such as a cache, a ROM, a PROM, an EPROM, an EEPROM, and flash memory, or a volatile memory device such as a RAM, or a storage medium such as a HDD and a CD-ROM, but is not limited thereto.

Meanwhile, each component shown in FIG. 7 refers to software and/or hardware components, such as a FPGA and an ASIC.

At least one component may be added or deleted corresponding to the performance of the components of the mobile device shown in FIG. 7. Furthermore, it will be readily understood by those of ordinary skill in the art that the mutual positions of the components may be changed corresponding to the performance or structure of the system.

Figure 11:
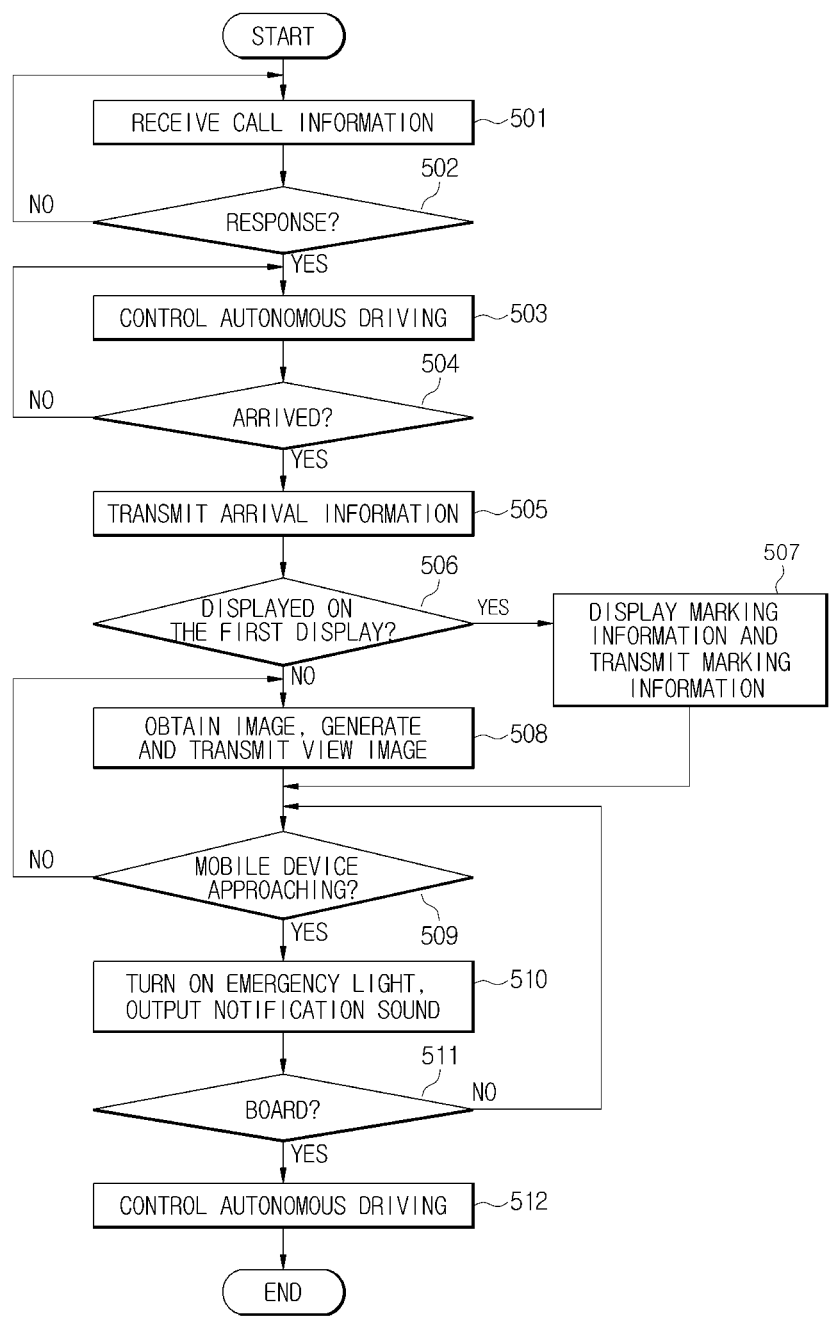
FIG. 11 is a view illustrating a control configuration of a vehicle.

FIG. 11 is a control flowchart showing a vehicle.

In response to the receipt of the call information through the server 2 or the infrastructure 4 (501), the vehicle 1 may transmit the response information or the rejection information based on the current location information of the vehicle, the current location information of the mobile device, and the destination information.

In response to the call (502), the vehicle 1 determines the current location information of the vehicle as the location information of the departure, search for a route from the departure to the current location of the mobile device based on the current location information of the mobile device and the location information of the departure received by the first communication interface 170, and control autonomous driving to the current location of the mobile device based on the route information, the road information, and the map information for the searched route (503).

During autonomous driving control, the vehicle may obtain the distance information between the vehicle and the mobile device based on the current location information of the vehicle and the current location of the mobile device, determine, based on the obtained distance information, whether the distance between the vehicle and the mobile device is less than or equal to the first reference distance, and upon determining that the distance between the vehicle and the mobile device is less than or equal to the first reference distance, determine that the vehicle has arrived (504) and transmit the arrival information to the mobile device 3 (505).

The vehicle determines whether the marking information may be displayed through the first display (506). The vehicle may determine whether the marking information may be displayed by determining whether display information on the marking information of the first display has been received from the mobile device that transmitted the call information and whether non-display information of the marking information has been received.

The vehicle may determine whether the first display is in an abnormal state or a normal state, and determine whether the marking information on the first display may be displayed in response to the determined state of the first display.

Upon determining that the marking information may be displayed through the first display (YES in 506), the vehicle may display the marking information recognizable by the user possessing the mobile device through the first display and transmit the marking information displayed on the first display to the mobile device (507). In this case, the mobile device may receive and display the marking information of the vehicle.

The vehicle may count a time from when the vehicle stops at a stop, compare the counted time with the preset time, and in response to the counted time falling within the preset time control the first display 140 so that the marking information of the vehicle is displayed and in response to the counted time passing the preset time control the first display 140 so that displaying of the marking information of the vehicle is terminated.

Upon determining that the displaying of marking information through the first display is unavailable, the vehicle may obtain the image information around the vehicle using the plurality of cameras, generate view images using the obtained image information around the vehicle, and transmit the generated view images to the mobile device (508).

More specifically, the vehicle determines whether the calling user is before getting into the vehicle based on at least one of door opening/closing information, door unlocking information, starting information, and occupant detection information, and upon determining that the user is before getting into the vehicle, generate the surrounding monitoring view image based on the image information obtained from the first, second, third, and fourth cameras and transmit the generated surrounding monitoring view image to the infrastructure 4 or the mobile device 3.

Upon determining that the calling user is before getting into, the vehicle may generate the 360-degree variable view image based on the image information obtained from the first, second, third, and fourth cameras, and transmit the generated 360-degree variable view image to the infrastructure 4 or the mobile device 3.

The vehicle transmits the surrounding monitoring view image and the 360-degree variable view image of the vehicle to the mobile device 3, and consequently the user possessing the mobile device may easily recognize the objects around the vehicle, the appearance of the vehicle, and the detailed location of the vehicle.

In this case, the mobile device may display at least one of the surrounding monitoring view image and the 360-degree variable view image. The mobile device may adjust the view image displayed on the second display in response to the user input, and display the adjusted view image on the second display.

The vehicle may generate, based on the current location information of the vehicle, the road information, and the map information, the map information in which the current location information of the vehicle and the road information are matched, and transmit the generated map information to the mobile device 3.

In this case, the mobile device may receive the map information in which the current location information of the vehicle and the road information are matched, and display the received map information on the second display.

When the AR mode is executed, the mobile device may display the image obtained from the cameras 320 as the AR image, recognize the image of the vehicle called in the AR image, and in response to the image of the called vehicle existing in the AR image display the indication mark on the image of the called vehicle.

In response to the image of the called vehicle existing in the AR image, the mobile device may generate vibration, output a notification sound, or change the color of the second display.

In response to the image of the called vehicle being not existed in the AR image, the mobile device may recognize the objects in the AR image, recognize the location where the vehicle is stopped based on the location information and identification information of the recognized objects and the current location information of the vehicle, display an arrow in a direction corresponding to a location where the vehicle is stopped.

When transmitting the map information to the mobile device 3, the vehicle may also transmit the images of surroundings of the vehicle acquired by the cameras, and upon determining that the business name information of a nearby building exists in the map information, transmit the business name information together, and transmit the distance information with the device together.

The vehicle may obtain periodically the distance information with the mobile device based on the current location information of the vehicle and the current location information of the mobile device, and upon determining that the mobile device exists within the certain distance based on the obtained distance information and the preset distance information determine that the mobile device is approaching (YES in 509) and then turn on the emergency light and output the notification sound (510).

Upon determining that the passenger has gotten into the vehicle (511), the vehicle may search for the route from the current location of the vehicle to the destination based on the destination information received from the first communication interface 170 and the current location information of the vehicle, match the map information to the route information and road information for the searched route, generate navigation information by matching the map information with the route information and the road information, and control autonomous driving based on the generated navigation information (512).

As is apparent from the above, various implementations of the present disclosure may display the marking information through the display provided outside the vehicle, so that a user calling the vehicle may easily recognize the vehicle responded to the call.

Further, various implementations of the present disclosure may provide an image generated by the SVM function to the mobile device of a user, so that the user may easily recognize the vehicle responded to a call.

Further, various implementations of the present disclosure may display the vehicle responded to a call through the AR function, so that a user may easily recognize the vehicle responded to the call.

Further, various implementations of the present disclosure may increase satisfaction of a user using a vehicle calling service.

Further, various implementations of the present disclosure may improve quality and marketability of a vehicle with the autonomous driving function, and further secure competitiveness of the product.

On the other hand, the above-described implementations may be implemented in the form of a recording medium storing instructions executable by a computer. The instructions may be stored in the form of program code. When the instructions are executed by a processor, a program module is generated by the instructions so that the operations of the disclosed implementations may be carried out. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

What is claimed is:

1. A vehicle, comprising:
   a display disposed at an exterior of the vehicle;
   a communication interface configured to (i) receive vehicle location information of the vehicle, (ii) communicate with a mobile device, and (iii) communicate with an infrastructure;
   a plurality of cameras; and
   a processor configured to, based on call information and device location information being received from the mobile device:
      control autonomous driving to move the vehicle to a location of the mobile device based on the device location information and the vehicle location information,
      based on a distance between the vehicle and the mobile device being less than or equal to a first reference distance, control the display to display marking information and transmit the marking information to the mobile device,
      control, based on the marking information being received from the infrastructure, the display to display the received marking information,
      generate a view image based on at least one of image information obtained by the plurality of cameras,
      obtain distance information regarding a distance from the vehicle to the infrastructure based on the vehicle location information and infrastructure location information, and
      transmit, based on the distance from the vehicle to the infrastructure being less than or equal to a second reference distance, the generated view image to the mobile device.

2. The vehicle of claim 1, further comprising:
   an emergency light,
   wherein the processor is further configured to:
      determine, based on the device location information and the vehicle location information, whether the distance between the vehicle and the mobile device is less than or equal to a preset distance, and
      based on a determination that the distance is less than or equal to the preset distance, turn on the emergency light.

3. The vehicle of claim 2, further comprising a speaker, wherein the processor is further configured to, based on the determination that the distance is less than or equal to the preset distance, control the speaker to output a notification sound.

4. The vehicle of claim 1, wherein the marking information includes at least one of text information, color information, or quick response (QR) code information.

5. The vehicle of claim 1,
   wherein the processor is further configured to:
      estimate an arrival time for the vehicle to arrive at the infrastructure based on the obtained distance information and driving speed information of the vehicle, and
      transmit, based the estimated arrival time being equal to a preset time, the generated view image to the mobile device.

6. The vehicle of claim 1, wherein the processor is further configured to transmit, to the mobile device, map information on which the vehicle location information is overlaid.

7. The vehicle of claim 6, wherein the processor is further configured to transmit, to the mobile device, the map information on which the vehicle location information is overlaid and the view image at same time.

8. The vehicle of claim 7, wherein the processor is further configured to:
   recognize an object around the vehicle based on the map information on which the vehicle location information is overlaid and the view image, and transmit, to the mobile device, information regarding the recognized object and information regarding a distance from the vehicle to the mobile device.

9. The vehicle of claim 1,
wherein the processor is further configured to:
recognize an identifier around an infrastructure based on image information acquired by the at least one camera from the plurality of cameras, and
transmit the recognized identifier to the mobile device.

10. A mobile device, comprising:
a communication interface configured to (i) receive device location information of the mobile device, (ii) communicate with a vehicle, and (iii) communicate with an infrastructure;
an inputter configured to receive call information for communication with the vehicle;
a display; and
a processor configured to:
transmit, based on response information from the vehicle being received, the device location information to the vehicle,
control, based on marking information being received from the vehicle, the display to display the received marking information,
control, based on the marking information being received from the infrastructure, the display to display the received marking information,
obtain distance information regarding a distance from the vehicle to the infrastructure based on vehicle location information and infrastructure location information, and
transmit, based on the distance from the vehicle to the infrastructure being less than or equal to a reference distance, a view image received from the vehicle to the mobile device.

11. The mobile device of claim 10, wherein the processor is configured to control, based on the view image being received from the vehicle, the display to display the received view image.

12. The mobile device of claim 10, wherein the processor is configured to, based on (i) map information on which the vehicle location information is overlaid and (ii) the view image being received from the vehicle, control the display to simultaneously display the map information on which the vehicle location information is overlaid and the view image.

13. The mobile device of claim 12, wherein the processor is configured to:
control, based on distance information being received from the vehicle, the display to display the received distance information regarding a distance between the vehicle and the mobile device, and
control, based on object information being received from the vehicle, the display to display the received object information.

14. The mobile device of claim 10, further comprising a camera,
wherein the processor is further configured to:
generate an augmented reality (AR) image based on an image obtained by the camera and the view image transmitted from the vehicle, and
control the display to display the generated AR image.

15. The mobile device of claim 14, wherein the processor is configured to adjust the view image based on input received by the inputter.

16. The mobile device of claim 14, wherein:
the view image includes at least one of a surrounding monitoring view image or a 360-degree variable view image, and
the processor is further configured to, based on input being received by the inputter, control the display to display at least one of the surrounding monitoring view image or the 360-degree variable view image.

* * * * *